US008285715B2

(12) United States Patent
Faria et al.

(10) Patent No.: US 8,285,715 B2
(45) Date of Patent: Oct. 9, 2012

(54) SYSTEM AND METHOD FOR THE STRUCTURED DISPLAY OF ITEMS

(75) Inventors: Arlo Mukai Faria, Berkeley, CA (US); Ajeet Ganesh Shankar, Berkeley, CA (US)

(73) Assignee: Ugmode, Inc., Berkeley, CA (US)

( * ) Notice: Subject to any disclaimer, the term of this patent is extended or adjusted under 35 U.S.C. 154(b) by 348 days.

(21) Appl. No.: 12/542,611

(22) Filed: Aug. 17, 2009

(65) Prior Publication Data

US 2010/0049707 A1     Feb. 25, 2010

Related U.S. Application Data

(60) Provisional application No. 61/089,412, filed on Aug. 15, 2008.

(51) Int. Cl.
*G06F 7/08* (2006.01)
*G06F 17/30* (2006.01)
(52) U.S. Cl. ........ 707/728; 707/749; 707/771; 707/776; 707/798; 707/801
(58) Field of Classification Search .................. 707/5, 7, 707/102, 999.005, 999.007, 999.102, 801, 707/798, 805, 741, 723, 728, 731, 749, 771, 707/776, 999.107; 715/221, 224, 227, 243, 715/244, 854
See application file for complete search history.

(56) References Cited

U.S. PATENT DOCUMENTS

| | | | |
|---|---|---|---|
| 7,542,610 B2 | 6/2009 | Gokturk et al. | |
| 7,617,185 B2 * | 11/2009 | Werner et al. | 1/1 |
| 7,689,624 B2 * | 3/2010 | Huang et al. | 707/760 |
| 7,761,454 B2 * | 7/2010 | Smyth et al. | 707/749 |
| 2006/0074870 A1 * | 4/2006 | Brill et al. | 707/3 |
| 2006/0251292 A1 | 11/2006 | Gokturk et al. | |
| 2006/0251338 A1 | 11/2006 | Gokturk et al. | |
| 2006/0251339 A1 | 11/2006 | Gokturk et al. | |
| 2006/0253491 A1 | 11/2006 | Gokturk et al. | |
| 2007/0156678 A1 * | 7/2007 | Ashkenazi et al. | 707/5 |
| 2008/0071764 A1 * | 3/2008 | Omi et al. | 707/5 |
| 2008/0091671 A1 * | 4/2008 | Dewulf | 707/5 |

OTHER PUBLICATIONS

"Using a Radar chart in Excel to see the big picture," Brooks, Susan and Byles, Bill, dated Jun. 23, 2008, retrieved from www.internet4classrooms.com on Apr. 9, 2012.*
Aigrain, et al., "Content-Based Representation and Retrieval of Visual Media: A State of the Art Review," Multimedia Tools and Applications 3, pp. 179-202, (1996).
Gangopadhyay., "An Image-Based System for Electronic Retailing," Decision support Systems 32, pp. 107-116, (2001). Smeulders, et al., "Content-Based Image Retrieval at the End of the Early Years," IEEE, vol. 22, No. 12, pp. 1-32, (2000).
Frankel, et al., "WebSeer: An Image Search Engine for the World Wide Web," Univ. of Chicago, Technical Report 96-14, pp. 1-15, (1996).
Gangopadhyay, A. "A Multi-agent System for Multimedia Information Retrieval in Electronic Retailing," *AMCIS 2002*:495-498.

* cited by examiner

*Primary Examiner* — Bruce Moser (57) ABSTRACT

A system and method for displaying items by receiving a query, identifying query feature values for similarity features associated with the query, identifying items each having item feature values for similarity features thereof, for each of the identified items and for each of the similarity features, determining a feature distance between the query feature value and the item feature value, and presenting the identified items in a two dimensional array of cells. The array defines reference vectors corresponding to the similarity features. The identified items are positioned within the array relative to the origin cell, for any of the cells, by determining difference function values. for the identified items each based on the feature distances of the item, the reference vectors and the coordinates of the cell, and placing one of the items in the cell based upon the determined difference function values.

27 Claims, 5 Drawing Sheets

SYSTEM AND METHOD FOR THE STRUCTURED DISPLAY OF ITEMS

RELATED APPLICATIONS

This application claims the benefit of U.S. Provisional Application No. 61/089,412, filed Aug. 15, 2008, and which is incorporated herein by reference.

FIELD OF THE INVENTION

The present invention relates to user interfaces. More particularly, the present invention relates a system and method for displaying an array of items organized by their similarity with respect to one or more common properties.

BACKGROUND OF THE INVENTION

Electronic commerce has steadily grown as online retailers have become better able to provide customers with a service that rivals the traditional shopping experience. Online retailers can offer the convenience of shopping from home, fast shipping and flexible return policies, as well as an enormous selection of products. However, this scale of inventory can be hundreds of times larger than what is ordinarily stocked in a brick-and-mortar store and poses a unique challenge to online retailers: it is practically impossible for a customer to explore all of the options.

For many types of merchandise, such as soft goods (e.g. apparel, shoes, accessories), customers' purchase decisions are heavily influenced by the how the merchandise looks. Unfortunately, traditional web retail interfaces employ text-based searching, and do not make use of the highly relevant information contained in images. Techniques from the field of content-based image retrieval can be applied to extract characteristic information from each image and determine the visual similarity between pairs of images. A common operation is to identify the set of images which are visually similar to a given query image.

Several applications of content-based image retrieval have been designed for the World Wide Web. Search engines such as Google Images or Gazopa attempt to index all of the publicly available image data Comparison shopping engines such as Pixsta or Like.com are more specifically targeted to (real-time) searching images of merchandise in the context of electronic commerce.

Searching via image content enables customers to sift through large inventories to find specific items. However, the search paradigm has limitations: many customers shopping for soft goods may not know how to characterize what they are searching for, and many more do not even have a precise idea of what it is they want. Instead, they prefer to browse, identifying characteristics of items they like and discovering items with similar characteristics that might satisfy their criteria for purchase. This model of product discovery is not well-supported by existing visual search interfaces.

BRIEF SUMMARY OF THE INVENTION

The aforementioned problems and needs are addressed by a method of (or processor configured for) displaying items having similarity features associated therewith, by receiving a query, identifying a plurality of query feature values for a plurality of similarity features respectively associated with the query, identifying a plurality of items each of which having a plurality of item feature values for the plurality of similarity features respectively associated therewith, for each of the identified items and for each of the similarity features, determining a feature distance between the query feature value and the item feature value, and presenting the identified items in a two dimensional array of cells each having coordinates relative to an origin cell, wherein the array defines a plurality of reference vectors corresponding to the plurality of similarity features. The identified items are positioned within the array relative to the origin cell, for any of the cells by determining difference function values for at least some of the identified items each based on the feature distances of the item, the reference vectors and the coordinates of the cell, and placing one of the items in the cell based upon the determined difference function values.

Other objects and features of the present invention will become apparent by a review of the specification, claims and appended figures.

DETAILED DESCRIPTION OF THE INVENTION

The present invention is a system and method for browsing a set of items. The primary display is a structured multi-dimensional array of items (referred to herein as "similarity array"), where the items are arranged to indicate their similarity to a query, with respect to multiple properties (hereafter referred to as "similarity features") thereof Submitting a query by selecting an item (e.g. by clicking on it with a pointing device) in the array yields another array containing items that are similar to the selected item with respect to the similarity features. The similarity features employed by the array can be based on features of the visual representation of its items, or on any other metadata associated with them. An item's location in the array indicates how similar it is to the selected item with respect to each of the similarity features. This structured layout enables users to intuitively locate items in the display that are similar to the selected item with respect to the features they care about. A number of array enhancements are also described, such as filtering and graphical overlays.

Figure 1:
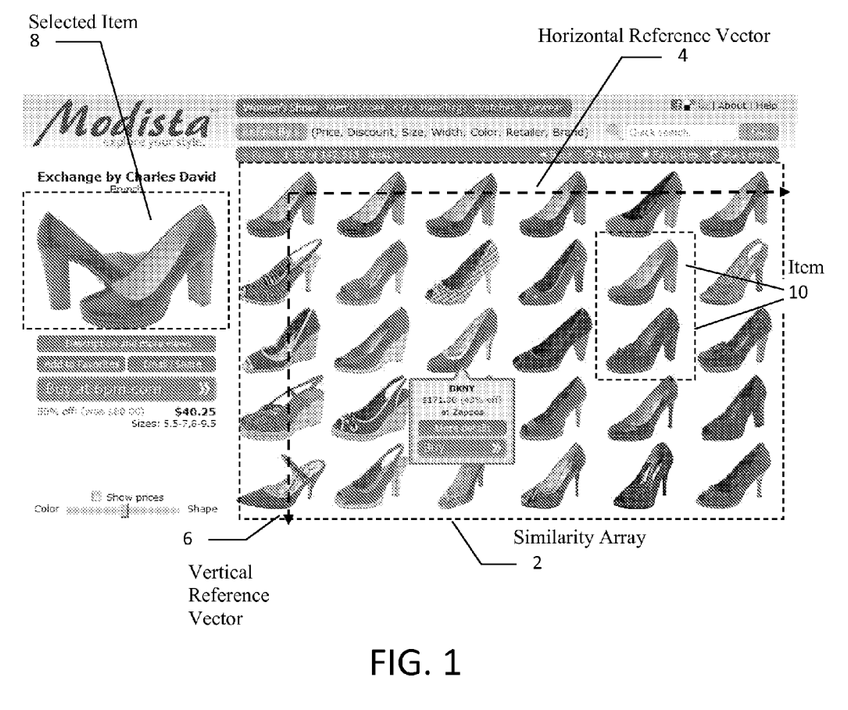
FIG. 1 is a diagram illustrating a similarity array of shoe items.

In a preferred embodiment, the similarity array is displayed as a two-dimensional array of the items, where the similarity features used to construct the array correspond to the visual aspects of color and shape of the pictured items. As used herein, the term "item" is intended to mean an abstract representation of an object (such as merchandise, described by metadata and an image). Items are populated in the array based on similarity with respect to the similarity features, which are represented by vertical and horizontal reference vectors. FIG. 1 illustrates an exemplary similarity array 2 as applied to shoe items, where the similarity feature of color is represented by the horizontal reference vector 4, and the similarity feature of shape is represented by the vertical vector 6. The selected item 8 is preferably displayed adjacent to the similarity array 2, which contains items 10 having varying degrees of similarity to the selected item 8 arranged in an array format. Items 10 closer to the top of the array have greater shape similarity to the selected item 8, and items 10 closer to the left of the array have greater color similarity to the selected item 8. An item 10 in the middle of the array has some amount of similarity with respect to both similarity features (of size and color), weighted by the item's proximity to the origin of each of the reference vectors 4 and 6. The array illustrated in FIG. 1 is populated in order of the best similarity matches, from the top left corner to the bottom right corner. Therefore, the item 10 at the top left array location is the most similar overall to the selected item 8 (and is considered the origin of the array). The item 10 at the bottom right array location is least similar in shape and color to the selected item 8, of the items displayed in the array. The top row of the array contains items 10 most similar in shape (of any color, but with declining similarity in shape as read left to right). The first column of the array contains items 10 most similar in color (of any shape, but with declining similarity in color as read top to bottom).

A user interaction with the exemplary similarity array of FIG. 1 can be as follows. First, the user is presented with assorted items 10 that bear no similarity to any selected item. These assorted items 10 can be chosen and positioned in the array in a number of ways, either randomly or with some similarity positioning. When the user selects one of the items 10, the array is populated with items 10 of varying similarity in color and shape as described above. Thus, by selecting an item, the user is presented with more items that look similar to it with respect to shape and/or color. If, for example, the feature of the selected item that the user is most interested in is its color, then he knows to look more closely to those items 10 positioned nearer the first column of the array. The user then continues by selecting a new item 10 in this region, invoking a new array and repeating this process. Eventually the user may find an item for purchase or other use.

The similarity array is a user interface that provides an intuitive mechanism for a user to visually examine a large number of items quickly. Because the array includes pictures of the items 10, the user does not spend any time reading text. Because the array is structured along two axes, the user knows where to look to favor a particular similarity feature over another. By constructing the array to vary similarity from the top left to the bottom right, the user knows to look near the top left for the most similar items, and further away to explore a range of less similar items that nonetheless retain some similar characteristics. Due to these properties, this interface is well suited for a user that is shopping for goods based on visual properties. The user can equally well hone in on a particular item's look or discover a larger variety of items in a general style.

Figure 2:
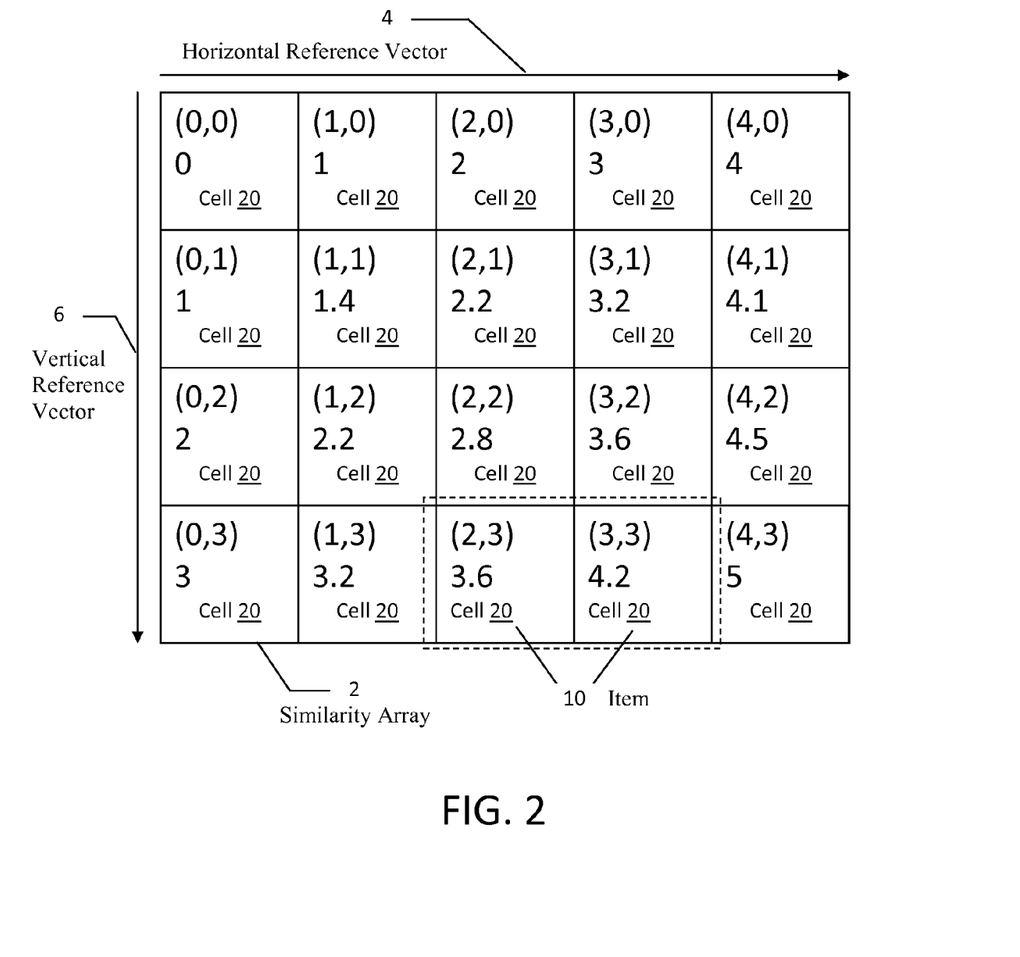
FIG. 2 is a diagram illustrating the components of a generic similarity array.
Figure 3:
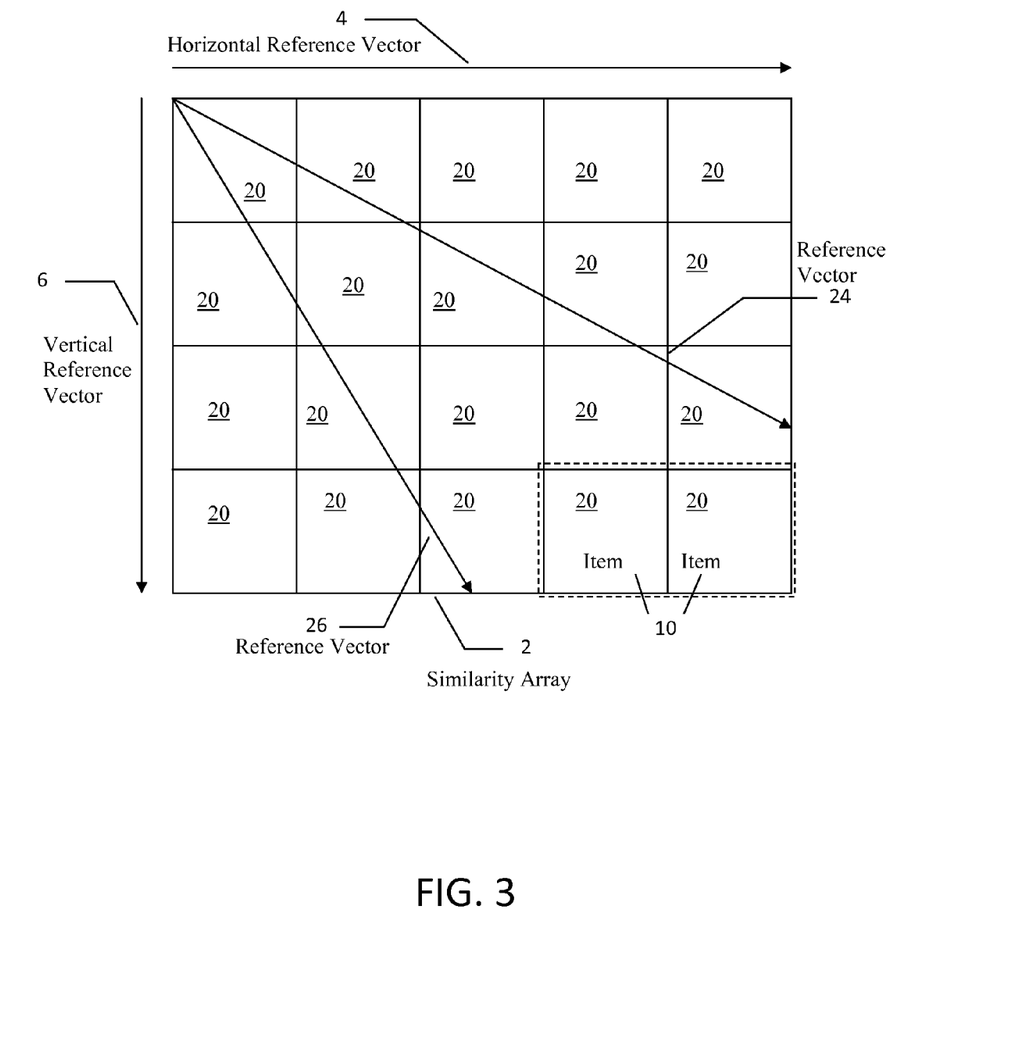
FIG. 3 is a diagram illustrating a similarity array with four reference vectors.

FIG. 2 illustrates the basic components of a two-dimensional similarity array 2. The array 2 includes a plurality of cells 20 that contain images of the items 10. One of the cells of the array is designated as the origin (in this example the upper left cell having coordinates (0,0)). All the cells 20 have two coordinates indexed relative to this origin. With the origin in the top-left cell of the array, all the other cells have positive coordinates corresponding to their horizontal and vertical displacement from the origin. Below the coordinates for each cell in FIG. 2 is its Euclidean distance from the origin cell; this proximity to the origin cell is used in filling the array. The illustrated array has "reference vectors" along its coordinate axes, each corresponding to a similarity feature. It is possible, however, for the array 2 to have more than two reference vectors (i.e. third and fourth reference vectors 24, 26), as illustrated in FIG. 3.

A similarity feature is a characteristic of items that is quantifiably comparable (e.g. shape, color, etc.). It should be noted that similarity features can be extracted from a single image, multiple images of the same item, and/or metadata associated with the item (e.g. price). A query is a specification of values for one or more similarity features. A query can be submitted in the form of an image (e.g. a selected item), where similarity features can be extracted or determined from the identified image. A query can also take the form of similarity feature values or information submitted by the user separate from an image (e.g. identification or submission of information relating to size, color, shape, price, or other descriptive or illustrative information about items which could be used to define similarity feature values useful for comparison). A similarity feature distance is the value of a comparison of similarity feature values. An item difference is defined by a difference function that combines distances between respective features of a query and an item. In one embodiment, the item difference function is a weighted summation of the distances. In another embodiment, the difference function is an algorithm.

The similarity array 2 is populated with items in response to a query. Each item's placement in the array is determined by its similarity to the query with respect to each of the features that correspond to the reference vectors of the array.

A preferred algorithm for populating an array in response to a query iterates over the cells 20 and chooses a unique item for placement in each cell, based on its difference from the query as determined using a difference function. For each cell 20, the difference function is parameterized by the coordinates of that cell, as well as the array's reference vectors. From among the items not yet placed in the array, the item chosen has the smallest difference from the query.

The parameterized difference function can be a weighted summation of the similarity distances for each feature. For example, the weight for each similarity feature can be the dot product of the coordinates of the cell and the reference vector corresponding to that feature. To illustrate a specific example of a difference function, consider an array in which the reference vectors lie on the Cartesian axes, vertical at (0,1) and horizontal at (1,0). These reference vectors correspond to color and shape features, respectively. Then for a cell in the array at coordinates (x,y), the difference function would be parameterized with a weight of y for color (i.e., the dot product of (0,1) and (x,y)) and a weight of x for shape (i.e., the dot product of (1,0) and (x,y)). For example, the difference function for cell at coordinates (2,3) would be equal to the color similarity distance times 2 plus the shape similarity distance times 3. For cells along the diagonal, such as at (3,3), the difference function for those cells would be parameterized with equal weights for both shape and color. For cells along one of the reference vectors, the parameterized difference function for those cells would be based only on the similarity distance for the feature that corresponds to that reference vector.

Now consider a specific cell, say (2, 1), and two potential items for placement in that cell; one has color and shape similarity distances, respectively, of 20 and 40 from the query, and the other has similarity distances 25 and 25. Based on the weighting described above, the first item has a parameterized difference for this cell of 2×20+1×40=60, and the second has a parameterized difference of 2×25+1×25=75. Since the first item has a smaller difference when parameterized for the cell (2,1), it would be chosen over the second for placement into the cell.

To populate the entire array, a preferred algorithm populates cells in order of decreasing proximity to the origin cell, where for each cell, an item is chosen from the group of items available for placement such that it minimizes that cell's parameterized difference between the query and items not already included in the array. Thus, a cell's parameterized difference between a query and the item in that cell is less than or equal to that cell's parameterized difference between the query and any item that is not in a cell as close or closer to the origin.

Preferably, the system employing the present invention pre-computes and stores feature values of some or all of the items in any given category, along with the distances between those values for selected pairs of items. Additionally, some arrays may be prepopulated and stored.

If there is no query specified, a queryless array can be constructed. Items 10 can be selected for and arranged in the array based on a random or deterministic function of item characteristics. For example, sets of items can be grouped together, and the array populated with items selected from some groups. Once items have been selected for an array, they can be arranged to minimize differences between neighboring items.

The array 2 is preferably presented along with other action buttons or information to enhance the user experience in browsing for items. For example, in the display of the array, an item may be displayed as a subset of its associated images or descriptive text, such as brand and model names for products. Actions that can be triggered by action buttons include selecting an item to serve as a query for creating a subsequent similarity array, viewing an item's product information, purchasing an item from a retailer, adding an item to a shopping cart, sharing an item with a friend, etc. Overlaid information that can accompany a similarity array includes graphical or textual representations of item characteristics such as price, rating, retailer, brand, availability in requested size, whether an item is on sale, etc.

It is preferable, but not necessary, to modify the images for display in the array so they all have a consistent appearance (e.g. similarity in viewing angle, size, etc.). Images of items may be scaled, cropped and altered to have the same dimensions, display a uniform pose, and/or have backgrounds of similar or same color.

Figure 4:
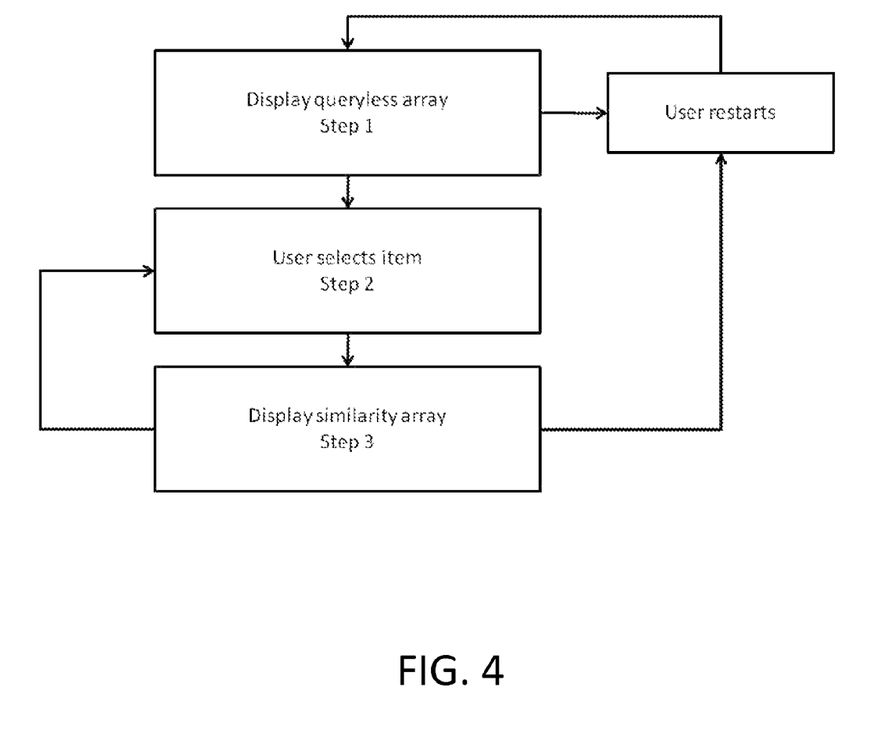
FIG. 4 is a flow diagram illustrating a user experience with similarity arrays.

FIG. 4 illustrates an exemplary user interactive session. The user is initially presented with a queryless array (step 1). Selecting an item in this array (step 2) yields a similarity array whose query is based on the selected item (step 3). Selecting an item in a similarity array also yields another similarity array whose query is based on the selected item. The user may at any time elect to view another queryless array.

There are several techniques that can allow a user to consider a greater number of items than can be displayed in a single array fitting in a single computer screen. For example, where a user specifies a query, the system can display a sequence of arrays in which items included in a given array of this sequence are omitted from arrays that follow in the sequence. This is analogous to clicking a "next page" button to see the next most similar items. Alternately, the system can construct a very large array, but only display a portion of it at any given time in the form of a smaller array (i.e. a sub-array). The sub-array being viewed can be modified by the use of scroll bars or other techniques to slide the window through which the user views the larger array. This is analogous to "panning" a smaller frame within a larger image.

The system can be configured to allow the user to specify the reference vectors of the similarity array and adjust each reference vector's angle and magnitude. Preferably the system supports additional features found in user interfaces. For example, a user can save an item into a shopping cart, or can send a particular item or a cart fill of items to another user. In addition to explicit saving and sharing, the system can automatically store a history of items selected by the user, and display these to the user in array form or otherwise. Instead of selecting an item to form a query, users may specify a query by, among other ways, providing a photograph, drawing a sketch, or providing a product identifier such as a barcode or SKU.

The system can further be configured to extract data from the browsing technique using the similarity array 2, which is unavailable in generic on-line browsing techniques. For example, in a traditional online item navigation experience, the default browsing action is to click on a "Next" button to view a new page of items, or a "Back" button to return to a previous screen. These actions do not indicate anything about the user's reaction to the displayed items except that he or she did not like any of the items presented. In contrast, the principal action of the system described herein is to select an item in the array. Even though the user may not be interested in buying the item, the action indicates some preference for the particular item, since the user chose it over any of the other items in the array. Thus, with every browsing action, the user exhibits a positive preference for an item, which the system operator can use to improve future interactions with the user or provide additional user preference information for the: selected and non-selected items.

Figure 5:
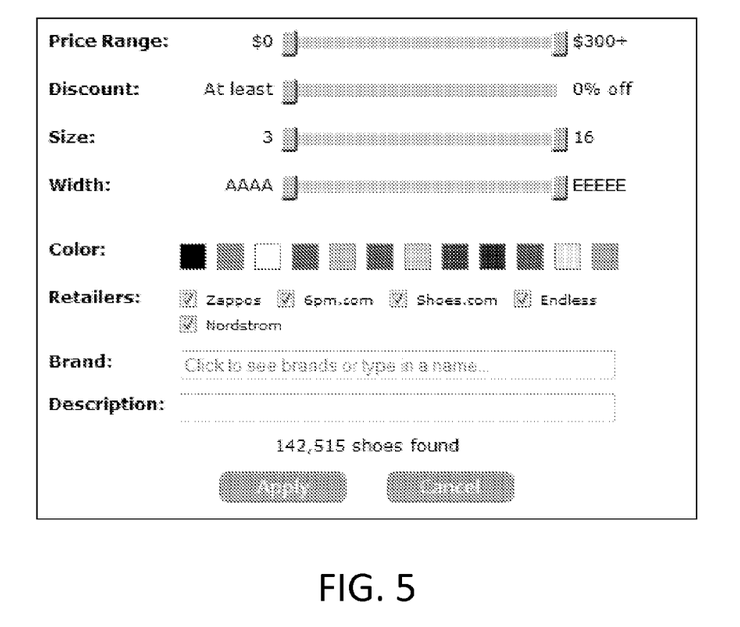
FIG. 5 is a diagram showing a screen that offers filtering functionality.

One or more filters can be used to reduce the number of items eligible for placement in any given array. Each filter is applied to all items, and any item that any filter does not accept is removed from the set of items to be considered for placement in an array. Items can be filtered by, among other things, price, color, discount, size, width, retailer, whether the item is in stock, and keywords (e.g. keywords present among an item's textual metadata, including its model name, brand, categories, and text description). The system can be configured to re-populate the array when the filter parameters are changed. Alternately, as the filter criteria changes, the user is shown the number of items in the current filtered subset. When the user indicates readiness, the array is repopulated with items meeting all of the new filter criteria, as illustrated in FIG. 5. Useful filter criteria can be enabled via user interface elements. For example, the system can apply a filter to include only items that cost less than a selected item by a specified amount. Alternatively, the system can apply a filter to display only items in stock that satisfy a user's other constraints.

Figure 6:
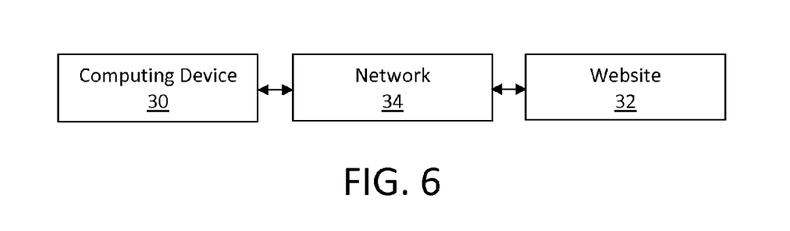
FIG. 6 is a diagram illustrating a computer hardware implementation of the similarity array.

The preferred implementation of the present invention is illustrated in FIG. 6, where a user operating a computing device 30 (e.g. a personal computer, PDA or smartphone) accesses a website 32 via a network 34 (e.g. the Internet) using browser software running on the computing device. The website generates the arrays according to input by the user, and sends the array information to the computing device for display to the user. However, any computing device 30 connected to any type of network 34 can be used to access the array information from a remote location. Alternately, a single computing device can generate the arrays using information locally stored or accessible by the computing device.

The present invention can be embodied in the form of methods and apparatus for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It is to be understood that the present invention is not limited to the embodiment(s) described above and illustrated herein, but encompasses any and all variations falling within the scope of the appended claims. For example, references to the present invention herein are not intended to limit the scope of any claim or claim term, but instead merely make reference to one or more features that may be covered by one or more of the claims.

What is claimed is:

1. A method of displaying items having similarity features associated therewith, comprising:
   receiving a query based on a user selection of an item;
   identifying a plurality of query feature values for a plurality of similarity features respectively associated with the query;
   identifying a plurality of items each of which having a plurality of item feature values for the plurality of similarity features respectively associated therewith;
   for each of the identified items and for each of the similarity features, determining a feature distance between the query feature value and the item feature value;
   presenting the identified items in a two dimensional array of cells each having coordinates relative to an origin cell, wherein the array defines a plurality of reference vectors corresponding to the plurality of similarity features, and wherein the identified items are positioned within the array relative to the origin cell by, for any of the cells:
   determining difference function values for at least some of the identified items each based on the feature distances of the item, the reference vectors and the coordinates of the cell, and
   placing one of the items in the cell based upon the determined difference function values.

2. The method of claim 1, wherein the similarity features include at least two of shape, color, texture, and price.

3. The method of claim 1, wherein the query is an item selected by a user.

4. The method of claim 3, wherein the similarity features include at least two of shape, color, texture, and price of the selected item.

5. The method of claim 1, wherein the items are at least one of shoes, bags, eyewear, watches, clothing, jewelry, or furniture.

6. The method of claim 1, wherein the identified items are positioned within the array relative to the origin cell iteratively, such that, for any given cell, the one item placed in the cell has a determined difference function value lower than others of the at least some of the identified items.

7. The method of claim 6, wherein the placing of the items in the cells is performed in order of decreasing proximity to the origin cell.

8. The method of claim 1, wherein the determining of the difference function values for each of the cells and each of the items comprises determining a dot product of the coordinates of the cell and the feature distances of the item.

9. The method of claim 1, wherein the determining of the difference function values for each of the cells and each of the items comprises determining a weighted summation of the feature distances for each of the similarity features.

10. The method of claim 9, wherein the determining of the weighted summation comprises determining a dot product of the feature's reference vector and the coordinates of the cell.

11. The method of claim 1, wherein the query is received from a user, and further comprising:
   the user specifying the features and the reference vectors.

12. The method of claim 1, further comprising:
   determining the item feature values before receiving the query.

13. The method of claim 12, wherein the determining of the feature distances is performed before receiving the query.

14. A system for displaying items having similarity features associated therewith, comprising:
   a processor configured for:
   receiving a query based on a user selection of an item;
   identifying a plurality of query feature values for a plurality of similarity features respectively associated with the query;
   identifying a plurality of items each of which having a plurality of item feature values for the plurality of similarity features respectively associated therewith;
   for each of the identified items and for each of the similarity features, determining a feature distance between the query feature value and the item feature value;
   generating a two dimensional array of cells each having coordinates relative to an origin cell that present the identified items, wherein the array defines a plurality of reference vectors corresponding to the plurality of similarity features, and wherein the identified items are positioned within the array relative to the origin cell by, for any of the cells:
   determining difference function values for at least some of the identified items each based on the feature distances of the item, the reference vectors and the coordinates of the cell, and
   placing one of the items in the cell based upon the determined difference function values.

15. The system of claim 14, further comprising:
   a display configured to receive the generated array from the processor and display the generated array on a display screen.

16. The system of claim 14, wherein the similarity features include at least two of shape, color, texture, and price.

17. The system of claim 14, wherein the query is an item selected by a user.

18. The system of claim 17, wherein the similarity features include at least two of shape, color, texture, and price of the selected item.

19. The system of claim 14, wherein the items are at least one of shoes, bags, eyewear, watches, clothing, jewelry, or furniture.

20. The system of claim 14, wherein the identified items are positioned within the array relative to the origin cell iteratively, such that, for any given cell, the one item placed in the cell has a determined difference function value lower than others of the at least some of the identified items.

21. The system of claim 20, wherein the placing of the items in the cells is performed in order of decreasing proximity to the origin cell.

22. The system of claim 14, wherein the determining of the difference function values for each of the cells and each of the items comprises determining a dot product of the coordinates of the cell and the feature distances of the item.

23. The system of claim 14, wherein the determining of the difference function values for each of the cells and each of the items comprises determining a weighted summation of the feature distances for each of the similarity features.

24. The system of claim 23, wherein the determining of the weighted summation comprises determining a dot product of the feature's reference vector and the coordinates of the cell.

25. The system of claim 14, wherein the query is received from a user, and wherein the processor is configured to receive a user specification of the features and the reference vectors.

26. The system of claim 14, wherein the processor is further configured to determine the item feature values before receiving the query.

27. The system of claim 26, wherein the processor is configured to perform the determining of the feature distances before receiving the query.

* * * * *